(12) United States Patent
Robadey et al.

(10) Patent No.: US 7,685,752 B2
(45) Date of Patent: Mar. 30, 2010

(54) CARRIER FOR IDENTIFICATION DEVICE WITH FERRITE ROD INSIDE OF CONNECTING STUD

(75) Inventors: Jean-Miguel Robadey, Bossonnens (CH); André Meilland, Romont (CH)

(73) Assignee: Assa Abloy AB (SE)

( * ) Notice: Subject to any disclaimer, the term of this patent is extended or adjusted under 35 U.S.C. 154(b) by 135 days.

(21) Appl. No.: 11/566,074

(22) Filed: Dec. 1, 2006

(65) Prior Publication Data
US 2007/0124966 A1 Jun. 7, 2007

(51) Int. Cl.
*G06F 3/00* (2006.01)
*H01Q 1/12* (2006.01)
*H01Q 1/00* (2006.01)
*H01Q 7/08* (2006.01)
*H01Q 1/36* (2006.01)
*A01K 15/04* (2006.01)
*G08B 13/14* (2006.01)

(52) U.S. Cl. .................. 40/301; 119/721; 343/718; 343/787; 343/788; 343/895; 340/572.7

(58) Field of Classification Search ............ 40/301; 343/787, 788, 895, 718; 119/721; 340/572.7
See application file for complete search history.

(56) References Cited

U.S. PATENT DOCUMENTS 5,461,807 A * 10/1995 Johnson .................. 40/301
6,026,818 A * 2/2000 Blair et al. .............. 128/899
6,098,324 A * 8/2000 Nepote .................... 40/301
6,145,225 A * 11/2000 Ritchey ................... 40/301
6,222,506 B1 * 4/2001 So ........................ 343/895
6,501,430 B1 * 12/2002 Esselink .................. 343/718
6,513,271 B2 * 2/2003 Hogan .................... 40/301
6,708,432 B2 * 3/2004 Haar et al. ............... 40/301
7,174,201 B2 * 2/2007 Govari et al. ............ 600/424
2002/0148146 A1 10/2002 Hogan

FOREIGN PATENT DOCUMENTS

EP 0283084 A 9/1988
WO WO 86/00498 A 1/1986
WO WO 91/10982 A 7/1991
WO WO 93/22907 A 11/1993

OTHER PUBLICATIONS

Apr. 3, 2006 European Search Report for Application No. EP 05 11 1796.

* cited by examiner

*Primary Examiner*—Joanne Silbermann
*Assistant Examiner*—Syed A Islam
(74) *Attorney, Agent, or Firm*—Sheridan Ross P.C.

(57) ABSTRACT

The carrier comprises a male part (1) and a female part (2), wherein the male part (1) has a stud (3) able to cooperate with a cavity (4) of the female part (2), wherein the stud (3) contains a ferrite rod (5) on his central axis (7). Said female part (2) comprises said antenna coil (6) so that when the stud (3) fully cooperates with the cavity (4) of the female part (2) through positioning means (9,10), the ferrite rod (5) is placed in the center (8) of the antenna coil (6).

7 Claims, 1 Drawing Sheet

CARRIER FOR IDENTIFICATION DEVICE WITH FERRITE ROD INSIDE OF CONNECTING STUD

FIELD OF THE INVENTION

The invention relates to a carrier for electronic identification devices, in particular transponders or RFID tags, made of two cooperating male and female parts. Applications of such carriers are for object (textile) marking, anti-theft devices and animal tags, in particular ear tags.

STATE OF THE ART

Tags, in particular ear tags, are known per se in the art. For example, document WO 93/22907 discloses an ear tag for animals with a female component comprising a housing in which an electronic identification device is located and a centrally located opening. This female component cooperates with a male component comprising a stem which is meant to pass through the ear of the animal into the opening of the female component and thereby fasten the two components together. In a broad aspect of the invention disclosed, the carrier is being constructed such as to be engageable with a co-operating component whereby the carrier and the cooperating component can be joined together to facilitate attachment of the carrier to an object to be identified. As a specific embodiment, this prior art indicates that the antenna of the electronic identification device can be wound in the housing, when said housing is open sided and thus form a bobbin.

Another example of an ear tag is given in EP 0 283 084. In this document, the problem to be solved is to provide a tag in which unauthorized removal of the tag leads to the situation that the signal generated by the tag is modified or can no longer be transmitted at all. This is done by providing the housing forming part of the tag with an electronic circuit having a wire loop passing through a pin used for fixing tag on each side of the animal's ear, the wire loop constituting part of the wiring of the electrical identification circuit. To remove the tag, the pin has to be cut which results in the circuit being inoperative, hence re-use useless, or the identification code of the circuit being changed, hence unauthorized re-use is detected.

However, the size and weight of the tags known from the prior art, in particular of the antenna coil, is a strong restriction for many applications, in particular as ear-tags for small animals.

Different attempts to improve the quality factor of such RFID tags have been made. This quality factor is essentially defined as the ratio of impedance by the resistance of the antenna coil. The resistance of the coil can be reduced by changing the material used, or by changing the diameter of the used wires. Materials more conductive than copper are too expensive for such applications. Increasing the diameter of the wires is restricted by the volume and the weight of the desired final product.

SUMMARY OF THE INVENTION

The idea of the invention is to integrate a ferrite rod in the stud, on its central axis, in such a way that the ferrite rod can be placed in the center of the antenna coil when the two parts (male and female) are mounted together to form the tag. It is the most appropriate place in such tags carriers as the stud also has an elongated rod form, and as emplacements for the antenna coil centralized on the stud are given (at least around the female cavity). The feature "in the center" is central for the invention and means here that the geometrical center of the ferrite rod must be positioned exactly on the geometrical center of the antenna coil.

In the preferred embodiment of the invention, the RFID Tag with antenna coil is encapsulated in the female part of a tag. The male part has a stud containing a ferrite rod in its central axis. By clipping the two parts together, the ferrite rod is positioned in center of the antenna coil, varying the inductance of the coil, changing its resonance frequency. In addition, through the provision of appropriate means, it is ensured that the proper positioning of the rod with respect to the antenna is not dependent on the thickness of the marked article or animal.

It allows to reduce the size and weight of the antenna/tag while maintaining the performances of the device. For example, by placing a ferrite rod of 3 mm diameter and 25 mm length in center of a antenna coil with an external diameter of 20 mm, the same performances (inductance, distance to read, frequency, . . . ) can be achieved as with a 30 mm diameter antenna coil without a central ferrite.

A very interesting achievement of the present invention is a transponder that will be correctly tuned (and reach its full RFID functionalities) only if the stud is fully and properly clipped in the female cavity with the rod in proper position. It can very easily be controlled that the stud is correctly engaged. Combined with tamper-evidence elements, it will make any fraud impossible. For example a farmer cannot use the tag on different animals without it being detected. Tamper-evidence elements are known per se in the art and could be mechanical or optical. For example, the mechanical clipping means for holding the stud in the cavity could be formed in such a way that one cannot pull the stud out of the cavity without breaking those clipping means, making any forgery visible. Optical tamper-evidence means could be for example marks, micro UV dots or hologram micro dots embedded in the plastic housing of the male and female parts, which make any repair of the housing parts impossible without leaving visual tamper evidences.

BRIEF DESCRIPTION OF THE DRAWINGS

The invention will be better understood in the text below together with the following drawings.

DETAILED DESCRIPTION OF THE INVENTION

Figure 1:
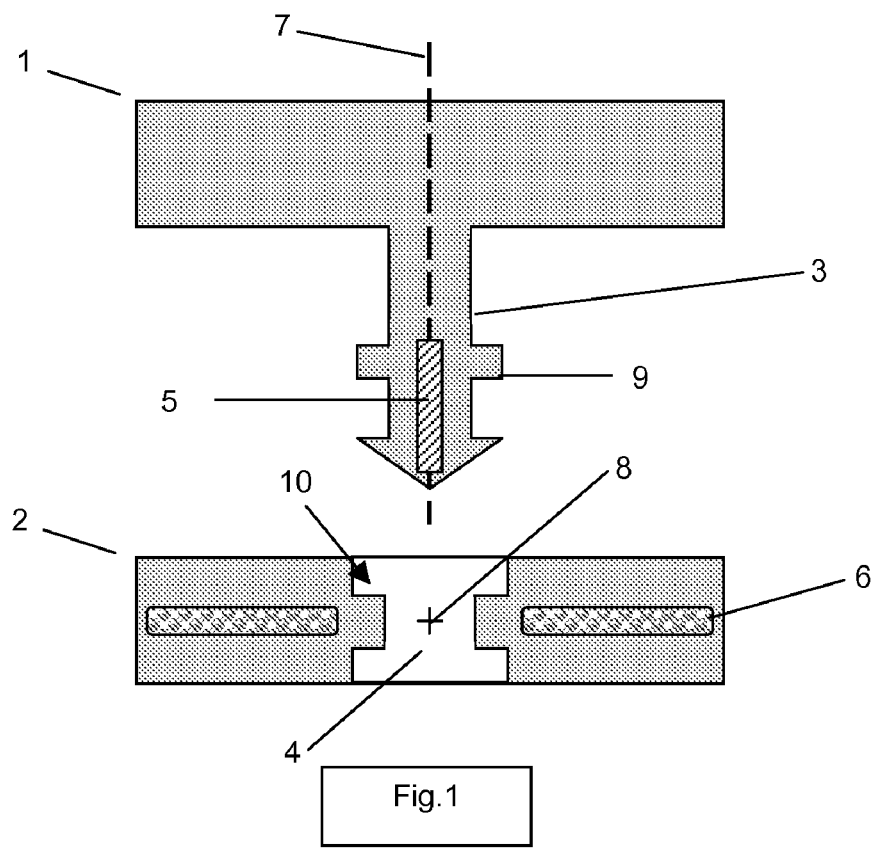
FIG. 1 shows a schematical cross section view of the carrier with two parts in a first relative position.

FIG. 1 shows the carrier according to the invention with the two parts (male and female) in a first relative position. More specifically, the carrier comprises a male part 1 and a female part 2, the male part 1 having a stud 3 intended to cooperate with an opening 4 in the female part 2.

The male part 1 also carries in the stud 3 a ferrite rod 5 which extends along the axis 7 of the stud 3.

Figure 2:
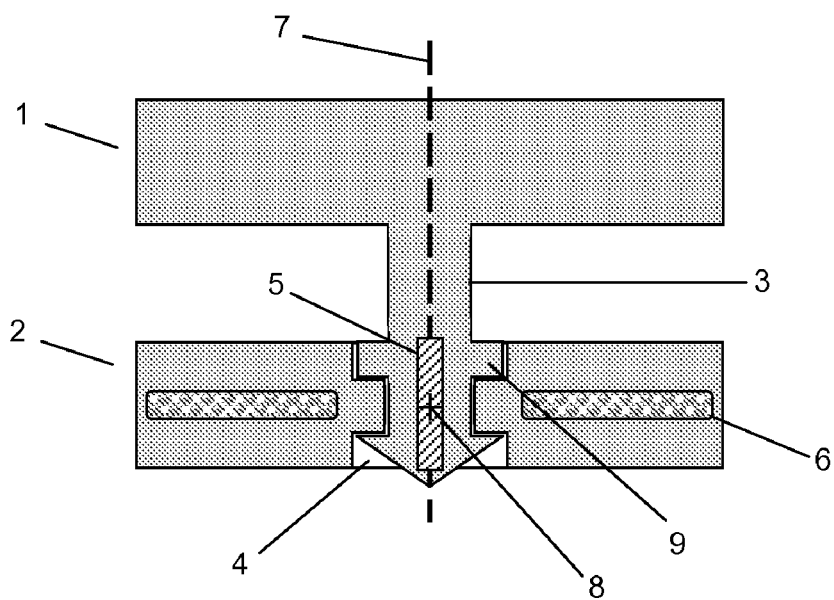
FIG. 2 shows a schematical cross section view of the carrier with two parts in a second relative position.

The female part 2 carries an antenna coil 6 for the transponder. To form the finished carrier, the stud 3 of the male part 1 is introduced into the cavity 4 of the female part 2. This situation is represented in FIG. 2. In this position, the ferrite rod 5 is placed exactly in the center 8 of the antenna coil 6 which allows to attain the improved technical properties mentioned above in the present description. Once again, "in the center" means that the geometrical center of the ferrite rod must be positioned exactly on the geometrical center 8 of the antenna coil. In the figures, the antenna coil is a flat concentric disc shape antenna. When the stud 3 is properly positioned in the cavity 4, the axis of the ferrite rod (that is identical with the central axis 7 of the stud) coincide with the central perpendicular axis of the antenna, and the ferrite rod is positioned exactly symmetrically regarding the center 8 of the antenna.

As shown in the figures, the system uses means to properly position the stud 3 (and the rod 5) in the cavity 4 of the female part. These positioning means include a lateral extension 9 on the stud 3 cooperating with a corresponding hollow 10 in the female part 2 which allows a proper positioning of the stud 3 in the cavity 4, as represented in FIG. 2. The extension 9 can have the shape of a circumferential ring or also of rods cooperating with the hollow (or another shape), as long as the result is the proper central positioning of the rod 5 in the antenna coil 6.

LIST OF NUMERICAL REFERENCES

1 male part
2 female part
3 stud
4 cavity
5 ferrite rod
6 antenna coil
7 central axis of the stud
8 center of the antenna coil
9 lateral extension
10 hollow

The invention claimed is:

1. Carrier for an electronic identification device comprising an integrated circuit and an antenna coil, said carrier comprising a male part and a female part, wherein the male part has a stud able to cooperate with a cavity of the female part, wherein the stud has a central axis and contains a ferrite rod on said central axis and wherein said female part comprises said antenna coil so that when the stud fully cooperates with the cavity of the female part, the ferrite rod is placed in the center of the antenna coil.

2. Carrier according to claim 1, wherein the ferrite rod is entirely embedded in the stud.

3. Carrier according to claim 1, wherein the electronic identification device is a transponder.

4. Carrier according to claim 1, wherein the antenna coil is correctly tuned to allow a full functionality of the electronic identification device only when the stud fully cooperates with the cavity of the female part.

5. Carrier according to claim 4, wherein the stud fully cooperates with the cavity of the female part through positioning means.

6. Carrier according to claim 1, wherein the carrier comprises tamper-evident elements.

7. Carrier according to claim 1, wherein the carrier is an animal ear tag.

* * * * *